United States Patent
Fatemi et al.

(10) Patent No.: US 9,678,564 B2
(45) Date of Patent: Jun. 13, 2017

(54) MULTIPROCESSOR SYSTEM WITH INTERRUPT DISTRIBUTOR

(71) Applicant: NXP B.V., Eindhoven (NL)

(72) Inventors: Hamed Fatemi, Eindhoven (NL); Ajay Kapoor, Veldhoven (NL); Jose de Jesus Pineda de Gyvez, Eindhoven (NL); Juan Diego Echeverri Escobar, Eindhoven (NL)

(73) Assignee: NXP B.V., Eindhoven (NL)

( * ) Notice: Subject to any disclaimer, the term of this patent is extended or adjusted under 35 U.S.C. 154(b) by 669 days.

(21) Appl. No.: 13/725,698

(22) Filed: Dec. 21, 2012

(65) Prior Publication Data

US 2014/0181351 A1 Jun. 26, 2014

(51) Int. Cl.
G06F 13/20 (2006.01)
G06F 1/32 (2006.01)
G06F 13/24 (2006.01)
G06F 13/364 (2006.01)

(52) U.S. Cl.
CPC ............ *G06F 1/329* (2013.01); *G06F 13/24* (2013.01); *G06F 13/364* (2013.01); *Y02B 60/144* (2013.01)

(58) Field of Classification Search
USPC ............... 710/260–269, 313–316, 305–306
See application file for complete search history.

(56) References Cited

U.S. PATENT DOCUMENTS

| | | | |
|---|---|---|---|
| 4,001,783 A * | 1/1977 | Monahan et al. | 710/264 |
| 5,987,556 A * | 11/1999 | Nakagawa et al. | 710/305 |
| 7,222,251 B2 * | 5/2007 | Ahmad et al. | 713/322 |
| 7,225,285 B1 * | 5/2007 | Fairman et al. | 710/266 |
| 7,793,025 B2 * | 9/2010 | Ehrlich et al. | 710/264 |
| 7,802,073 B1 | 9/2010 | Cheng et al. | |
| 8,458,386 B2 * | 6/2013 | Smith et al. | 710/262 |
| 8,769,177 B1 * | 7/2014 | Wright | 710/260 |
| 8,812,761 B2 * | 8/2014 | Heller et al. | 710/267 |
| 8,959,270 B2 * | 2/2015 | de Cesare et al. | 710/267 |
| 2007/0143514 A1 * | 6/2007 | Kaushik et al. | 710/260 |
| 2007/0260794 A1 * | 11/2007 | Ashish et al. | 710/267 |
| 2009/0089470 A1 * | 4/2009 | Ven | 710/260 |
| 2009/0198850 A1 * | 8/2009 | Suzuki | 710/267 |
| 2009/0248934 A1 * | 10/2009 | Ge et al. | 710/261 |
| 2011/0072180 A1 * | 3/2011 | Lee | 710/260 |
| 2012/0089761 A1 * | 4/2012 | Ryu et al. | 710/267 |
| 2012/0260258 A1 | 10/2012 | Regini et al. | |

FOREIGN PATENT DOCUMENTS

EP 2330506 A1 6/2011

OTHER PUBLICATIONS http://www.research.ibm.com/cell/ retrieved on-line Feb. 3, 2016.
(Continued)

*Primary Examiner* — Raymond Phan

(57) ABSTRACT

An intelligent interrupt distributor balances interrupts (workload) in a highly parallelized system. The intelligent interrupt distributor distributes the interrupts between the processor cores. This allows lowering of voltage and frequency of individual processors and ensures that the overall system power consumption is reduced.

20 Claims, 5 Drawing Sheets

(56) References Cited

OTHER PUBLICATIONS

B. Calhoun, J. Ryan, S. Khanna, M. Putic, and J. Lach "Flexible Circuits and Architectures for Ultra low Power," Proceedings of the IEEE, vol. 98, No. 2, Feb. 2010.
http://en.wikipedia.org/wiki/Pentium/ retrieved on-line Feb. 3, 2016.
http://en.wikipedia.org/wiki/PowerPC/ retrieved on-line Feb. 3, 2016.
R.P. Kleihorst, A.A. Abbo, A. van der Avoird, M.J.R. Op de Beeck, and L. Sevat."Xetal: A Low-Power High-Performance Smart Camera Processor". In IEEE Int. Symposium on Circuits and Systems (ISCAS), pp. 215-218, Sydney, NSW, Australia, May 2001. IEEE Computer Society. Abstract Only.
Fujita, Sholin Kyo, Nobuyuki Yamashita, and Shin'ichiro Okazaki. "A 10 GIPS SIMD rocessor for PC-based Real-Time Vision Applications Architecture, Algorithm Implementation and Language support". In in Proceedings of the 4th International Workshop of the Computer Architecture for Machine Perception, (CAMP), pp. 22-32, Washington, DC, USA, Oct. 1997. IEEE Computer Society. Abstract Only.
R.I.M.P. Meijer, Body Bias Tuning in Modem Digital, Integrated Circuit Designs, Technical report, NXP semiconductor, 2008.
Cas Groot, Automated Power Switch Generator and Design Flow, Technical report, NXP semiconductor, 2010.
A. P. Chandrakasan and R. W. Brodersen, Low Power Digital CMOS Design, Boston: Kluwer Academic Publishers (Now Springer), 1995.
Dakai Zhu, Rami Melhem, Bruce R. Childers, Scheduling with Dynamic Voltage/Speed Adjustment Using Slack Reclamation in Multiprocessor Real-Time Systems, IEEE Transactions on Parallel and Distributed Systems, vol. 14, No. 7, Jul. 2003.

\* cited by examiner

MULTIPROCESSOR SYSTEM WITH INTERRUPT DISTRIBUTOR

BACKGROUND

Typically, computing systems such as desktop computers and mainframes are designed to provide the highest possible throughput. However, in the last decade or so, the proliferation of mobile computing systems such as laptops, smartphones and tablets which typically place a premium on long battery life has shifted the design focus towards optimizing both speed and battery lifetime. Mobile computing systems incorporate the minimization of power consumption as an important design parameter. The advent of E-metering, microcontrollers, sensors and smartcards has made minimization of power consumption an even more important feature.

In typical microprocessor or microcontroller applications, the microprocessor or microcontroller gathers information from various sources to make a decision or measurement, for example, encephalography, security or sensor applications. Most of the information gathered reaches the microprocessor via an interrupt. Various techniques at both the architecture and circuit level have been investigated to maximize throughput and minimize latency of the computing system. These techniques typically lead to an increase in the total power dissipation of the system. In order to compensate for the increased power dissipation, techniques have been introduced to reduce system power consumption such as body biasing and clock gating, for example.

The performance of general purpose microcontroller or microprocessor systems is typically limited by the number of interrupts that need to be handled simultaneously. The design of these microcontroller systems typically requires a certain throughput to be able to handle the required number of simultaneous interrupts. To maintain adequate throughput requires a minimum supply voltage to be provided to the microcontroller system which then determines the power consumption of the microcontroller system.

SUMMARY

In accordance with the invention, power efficient computation is achieved while maintaining overall system throughput. This may be achieved by appropriately managing the computer system's operating voltage and frequency. To compensate for the loss of throughput due to the lowered operating voltage and frequency, processor parallelization is introduced into the system architecture by having more than one processor. An Intelligent Interrupt Distributer (IID) is provided in a computer system architecture in accordance with the invention to balance interrupts among the processors. In accordance with the invention, the computer system may be configured for either throughput optimization or reduced power consumption. If the voltage and frequency are not reduced, the throughput is increased because more than one processor is working. However, the voltage and frequency may be appropriately reduced so that throughput remains the same as in the single processor configuration. Additionally, in accordance with the invention, the maximum throughput and minimum power mode can be configured to comply with the application requirements.

DETAILED DESCRIPTION

Figure 1:
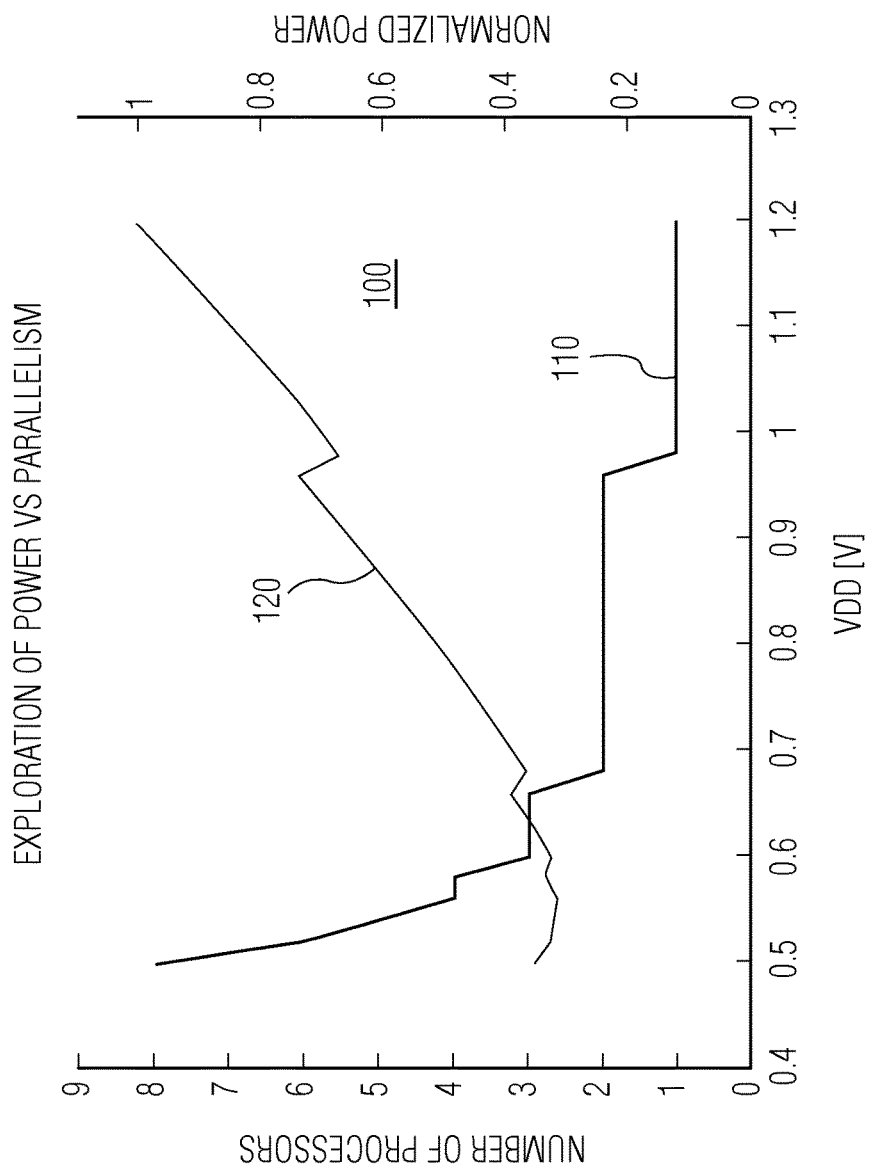
FIG. 1 shows the overall reduction in power consumption in accordance with the invention.

In an embodiment in accordance with the invention, the minimum operating voltage is reduced by using an IID to distribute interrupts among multiple processors in a computer system while the computer system appears as a single processor system to the user. No change to the binary code is typically needed. In accordance with the invention, the computer system may be a microcontroller or microprocessor system, for example. The IID incorporates both static and dynamic tuning of the computer system voltage and frequency. The concept of the IID is based on the sharing of interrupts among the multiple processors. If the processor is in idle mode and not busy then the IID schedules the incoming interrupt to that processor. Power-aware scheduling algorithms for interrupts with and without priority constraints are used. Power-aware interrupt scheduling with priority constraints means that when multiple interrupts arrive at the IID, the interrupts are scheduled according to a predefined interrupt priority typically defined by the programmer. The IID receives all interrupts and distributes the interrupts among the multiple processors based on availability. This distribution of the interrupts among the multiple processors by the IID recovers time not used by one processor to reduce the total energy consumption of the system. In summary, the IID detects the interrupts from the peripheral devices, distributes the interrupts to the processors and adjusts the supply voltage going to the processors and adjusts the operating frequency of the processors.

The scaling (reduction) of voltage results in the reduction of the throughput in a processor. Hence, if one reduces the supply voltage to a processor in a system, the resulting reduction in throughput in the processor needs to be compensated for. In an embodiment in accordance with the invention, compensation is achieved by having processors in parallel. The number of processors (N) needed to compensate for a given reduction in throughput is given by the following equation:

$$N_{@Freq2} = \left\lceil \frac{Freq_{Vdd1}}{Freq_{Vdd2}} \right\rceil = \left\lceil \frac{V_{dd2}}{(V_{dd2} - V_{th})^\alpha} \frac{(V_{dd1} - V_{th})^\alpha}{V_{dd1}} \right\rceil \quad (1)$$

where $N_{@Freq1}=1$, Freq1 is the original frequency, $V_{dd1}$ is the original supply voltage, $V_{th}$ is the threshold voltage which is one characteristic of the transistors and the threshold voltage is defined as the minimum voltage that required to turn the transistor ON. Freq2 is the reduced frequency at the scaled supply voltage $V_{dd2}$. $\lceil \; \rceil$ is the ceiling function. The exponent a accounts for the velocity saturation of the transistors and may take on any value between one, complete velocity saturation and two, no velocity saturation. As the number of processors operating in parallel is increased, there will be a capacitance overhead due to multiplexing.

See, for example, A. P. Chandrakasan and R. W. Brodersen, *Low Power Digital CMOS Design*, Boston: Kluwer Academic Publishers (Now Springer), 1995 incorporated herein by reference.

Total switching capacitance in the multi-processor system, where N is the number of parallel processors is given by:

$$\frac{C_{new}}{C_{old}} = [N + \lambda(N-1)] \quad (2)$$

with $C_{new}$ and $C_{old}$ representing the switching capacitance of the scaled voltage system and the original voltage system, respectively. $\lambda$ represents the overhead of the additional hardware (multiplexing, registers etc—see A. P. Chandrakasan and R. W. Brodersen incorporated by reference above). The scaled voltage system will run at N times lower frequency. Therefore, total power consumption in the system can be given by:

$$\frac{P_{Vdd2}}{P_{Vdd1}} = [N + \lambda(N-1)] \frac{V_{dd2}^2}{V_{dd1}^2} \times \frac{1}{N} \quad (3)$$

where $P_{Vdd2}$ is the power consumption in the scaled voltage system with N processors and $P_{Vdd1}$ is the power consumption in the original voltage system with one processor. FIG. 1 shows the overall reduction in power consumption achieved by this method. Graph 100 is based on data from CMOS90 process where the nominal supply voltage, $V_{dd}$=1.2V. The x-axis shows the supply voltage $V_{dd}$. Curve 110 is plotted against the y-axis on the left side. The y-axis on the left shows the number of processors needed as the supply voltage is decreased below 1.2 V to maintain the same throughput. For example, curve 110 shows that increasing the number of processors to 2 reduces the voltage from ~1.2 V to ~0.7 V and reduces the power consumption to 0.4 (normalized-a factor of 2.5 reduction). Curve 120 shows the power reduction (y-axis on the right) when voltage is reduced. The y-axis on the right shows the power consumption in the scaled voltage system as a ratio of the power consumed in the original voltage system.

Figure 2:
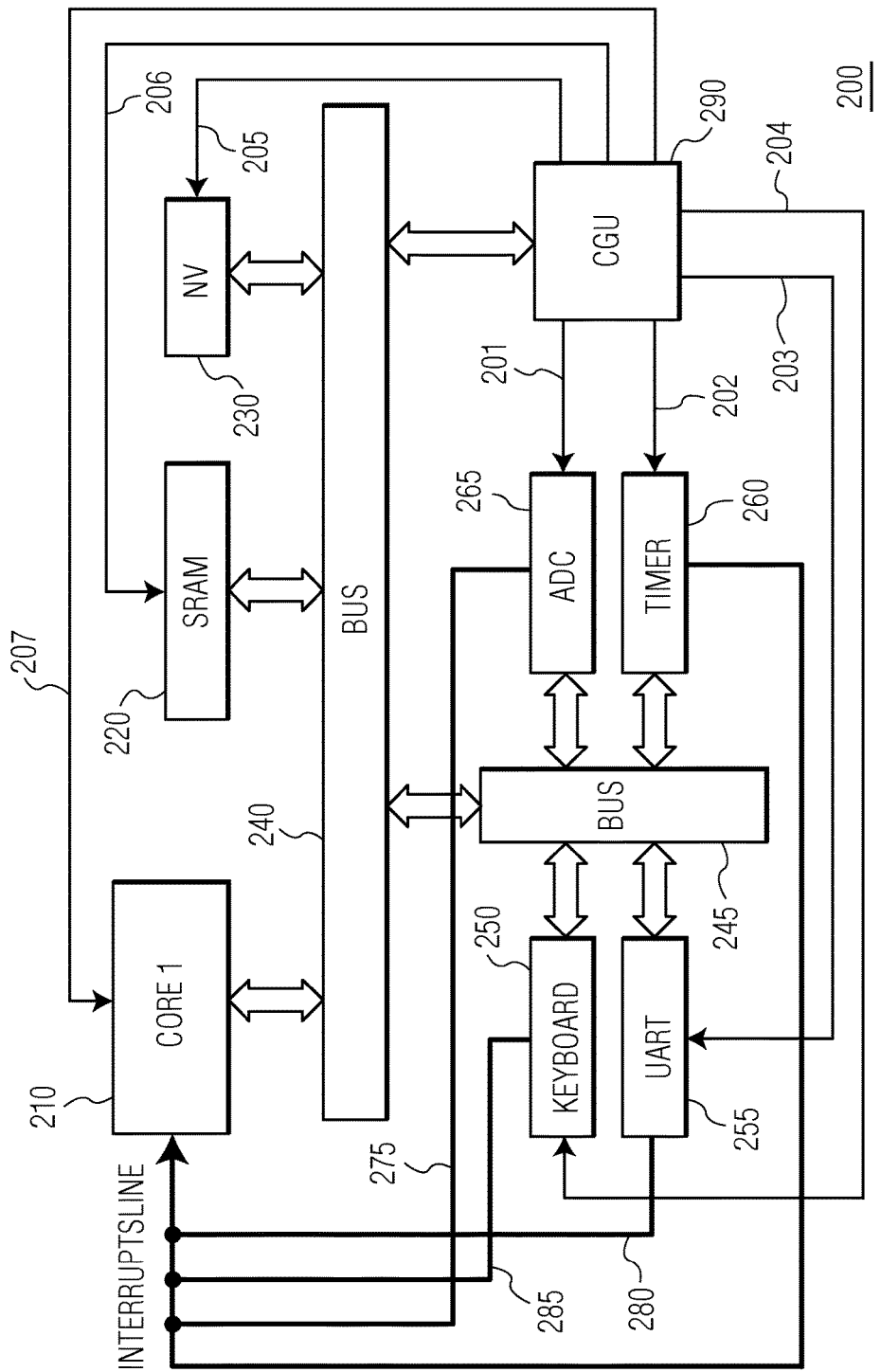
FIG. 2 shows a prior art embodiment.

FIG. 2 shows typical prior art single processor system 200 having single processor processor 210, SRAM 220, nonvolatile memory 230, bus 240 for connecting nonvolatile memory 230 and SRAM 220 to processor 210. Additionally, keyboard 250, Universal Asynchronous Receiver/Transmitter (UART) 255, Timer 260 and Analog-to-Digital Converter (ADC) 265 are connected to bus 245. Clock Generation Unit (CGU) 290 connected to bus 245 is the generating clock for single processor system 200. Note CGU 290 provides a fixed clock in the context of single processor system 200. Peripheral interrupt line 285 directly connects keyboard 250 to processor 210. Peripheral interrupt line 280 directly connects UART 255 to processor 210. Peripheral interrupt line 275 directly connects ADC 265 to processor 210. Peripheral interrupt line 270 directly connects timer 260 to processor 210.

Figure 3:
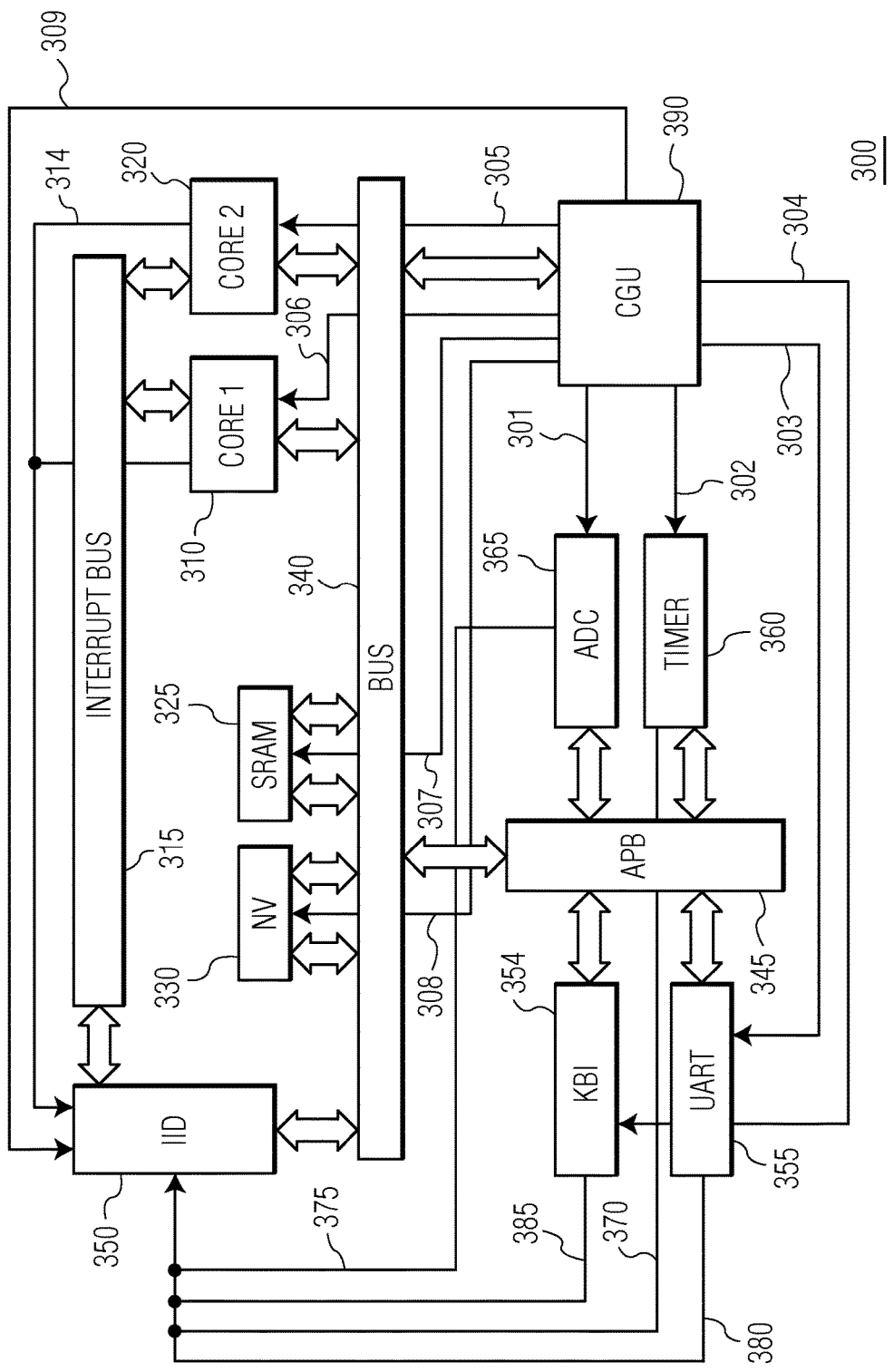
FIG. 3 shows an embodiment in accordance with the invention.

FIG. 3 shows an embodiment in accordance with the invention. Multiprocessor system 300 has processors 310 and 320 connected to bus 340. Dual port SRAM 325 and dual port nonvolatile memory 330 are also connected to bus 340. Bus 340 supports two masters, i.e. processors 310 and 320. Additionally, IID 350 is connected to bus 340. IID 350 distributes the interrupts between processors 310 and 320 on interrupt bus 315. The width of interrupt bus 315 is the total number of interrupts supported by core 310 and core 320. Based on the interrupts received, IID 350 adjusts both the frequency and the voltage. Line 304 carries the return from interrupt signal to IID 350 from processors 310 and 320 which indicates the completion of the interrupt to IID 350. Clock Generation Unit (CGU) 390 provides dynamic clock gating and scaling for multiprocessor system 300 and is connected to bus 340. IID 350 sends commands to CGU 390 to adjust the clock (frequency) for processor 310 and 320. Dedicated clock lines 301, 302, 303, 304, 305, 306, 307, 308 and 309 connect from CGU 390 to ADC 365, Timer 360, UART 355, KBI 354, Core 320, Core 310, SRAM 325, nonvolatile memory 330 and IID 350, respectively, to provide clock signals.

Keyboard Interface (KBI) 354, Universal Asynchronous Receiver/Transmitter (UART) 355, ADC 365 and Timer 360 are all connected to Advance Peripheral Bus (APB) 345 which is connected to bus 340. Peripheral interrupt line 385 directly connects keyboard 355 to IID 350. Peripheral interrupt line 380 directly connects UART 355 to IID 350. Peripheral interrupt line 375 directly connects ADC 365 to IID 350. Peripheral interrupt line 370 directly connects timer 360 to IID 350. Note, that unlike in FIG. 2, all peripheral interrupt lines 370, 375, 380 and 385 directly connect to IID 350 and not to cores 310, 320. Dual port SRAM 325 is used as it typically consumes less power than 2 single port SRAMs. Dual port nonvolatile memory (NV) 330 is used so that both processors 310 and 320 can execute interrupts.

Multiprocessor system 300 remains a "single processor system" from the point of view of the user. This means that the binary code for single processor system 200 typically does not need to be modified for execution on multiprocessor system 300. IID 350 schedules interrupts between processors 310 and 320 by examining the workload of processors 310 and 320. If processor 310 or 320 is free, the coming interrupt is scheduled for the free processor. Therefore, the hardware changes introduced in multiprocessor system 300 are typically transparent to the user and the user can typically replace single processor system 200 with multiprocessor system 300 without any modifications.

Figure 4:
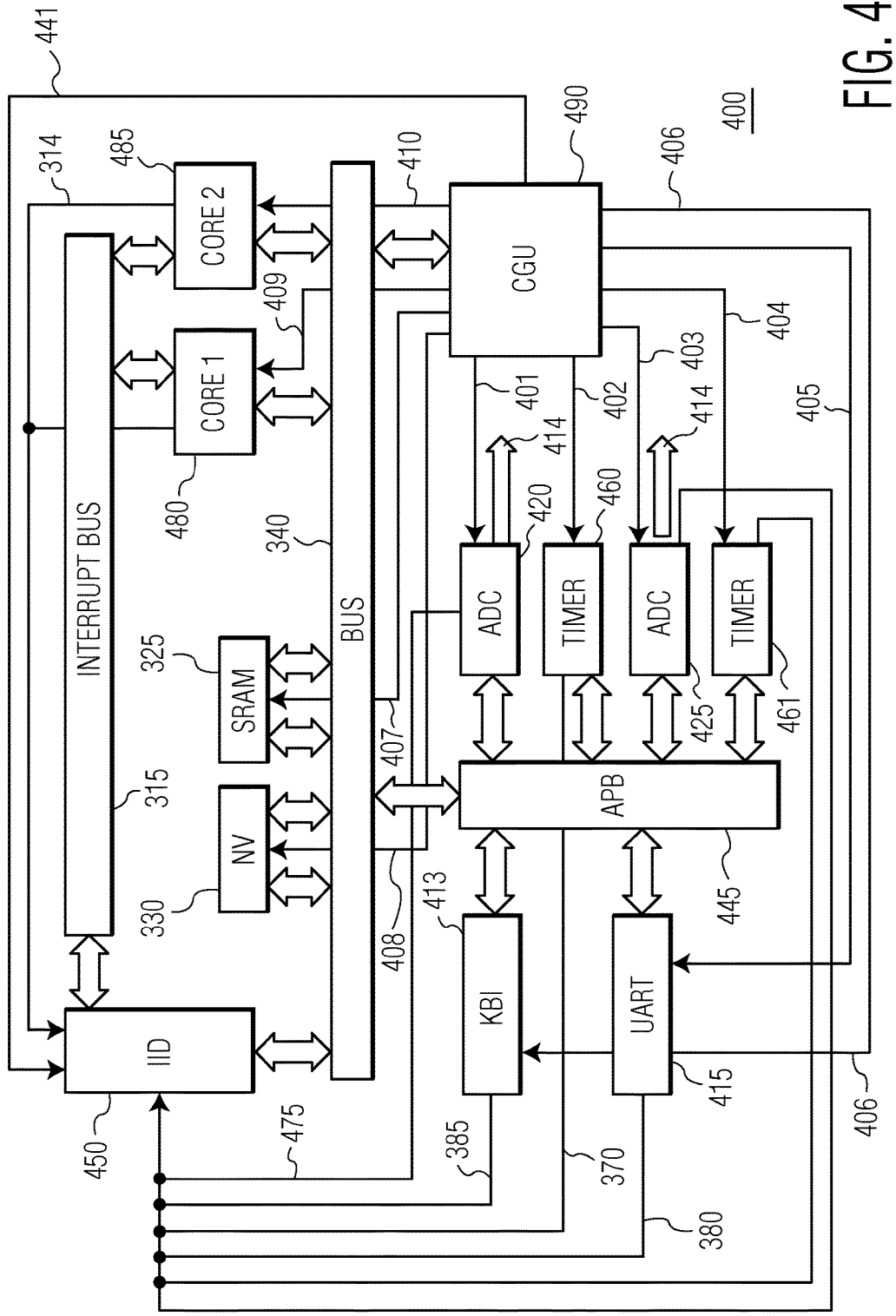
FIG. 4 shows an embodiment in accordance with the invention.

FIG. 4 shows multiprocessor system 400 in an embodiment in accordance with the invention with analog to digital converter (ADC) 420 having connection 412 to external a first external temperature sensor (not shown) and ADC 425 having connection 414 to second external temperature sensor (not shown). Dedicated clock lines 401, 402, 403, 404, 405, 406, 407, 408, 409, 410 and 411 connect from CGU 490 to ADC 420, Timer 460, ADC 425, Timer 461, UART 415, KBI 413, SRAM 325, nonvolatile memory 330, Core 480, Core 485 and IID 450, respectively. KBI 413 is connected to a keyboard (not shown) and UART 415 is connected to the user (not shown). KBI 413, ADCs 420, 421, Timers 460, 461 and UART 415 are all connected to APB bus 445. When a temperature sample is available from one of the two temperature sensors, the relevant ADC, ADC 420 or ADC 425 sends an interrupt on peripheral interrupt 475 or 476, respectively, to either processor 480 or processor 485 which is intercepted by IID 450. IID 450 routes the interrupt to the first available processor and the temperature sample is stored in memory SRAM 325 by either processor 480 or processor 485. Every 1 ms, for example, the temperature samples stored in SRAM 325 are filtered and restored in SRAM 325. When requested via KBI 413 by the user on the keyboard, the last filtered temperature samples are provided to the user via UART 415. All interrupt service routines (ISR) or interrupt handlers are stored in the dual port nonvolatile memory 330. If there were "n" processors and each processor had a nonvolatile memory, then one could use an "n" port nonvolatile memory or a separate nonvolatile memory for each processor. When processor 480 or processor 485 completes the execution of an interrupt, the return from interrupt signal 304 is set to 1. IID 450 checks return from interrupt signal 304 to identify which processor, processor 480 or processor 485 is free or idle. If both processors 480 and 485 are free or idle, the interrupt is sent to processor 480, for example.

Figure 5:
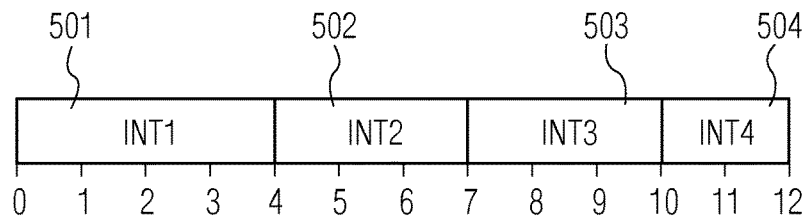
FIG. 5 shows interrupt scheduling in accordance with FIG. 2.

With reference to FIG. 3, IID 350 primarily operates to schedule interrupts between processor 310 and processor 320. In an example shown in FIG. 5, assume that four interrupts 501, 502, 503 and 504 are coming to IID 350 and the execution times are 4 seconds, 3 seconds, 3 seconds and 2 seconds, respectively. Total execution time for the 4 interrupts in single processor system 200 on processor 210 is 12 seconds.

Figure 6:
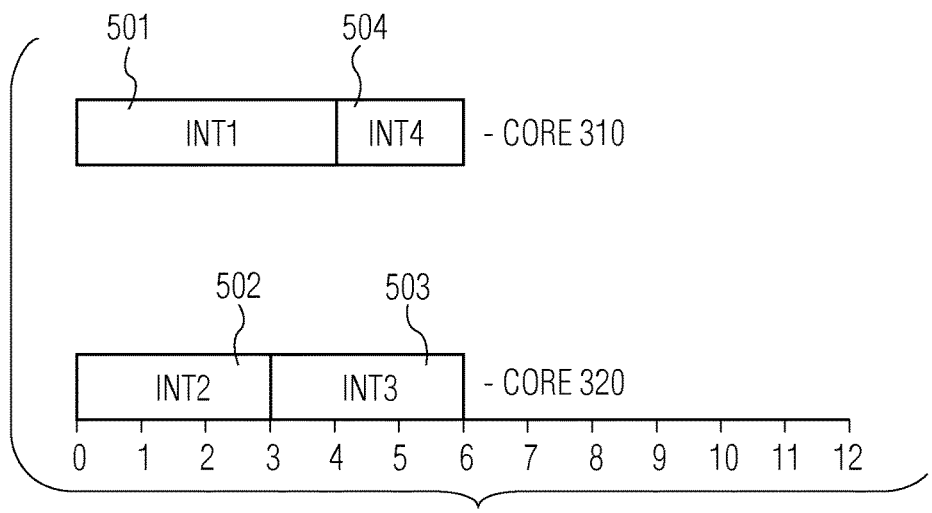
FIG. 6 shows interrupt scheduling for an embodiment in accordance with the invention.

FIG. 6 shows the scheduling of the same interrupts 501, 502, 503 and 504 on multi-processor system 300. IID 350 first sends interrupt 501 to processor 310 and interrupt 502 to processor 320. Because interrupt 502 is completed after 3 seconds, the next interrupt, interrupt 503 is sent to processor 320 by IID 350 because processor 310 is still busy. Interrupt 504 is sent to processor 310 by IID 350. From FIG. 6 it can be seen that the total time required to handle the 4 interrupts in multiprocessor system 300 is 6 seconds, i.e. half the time required in single processor system 200.

Figure 7:
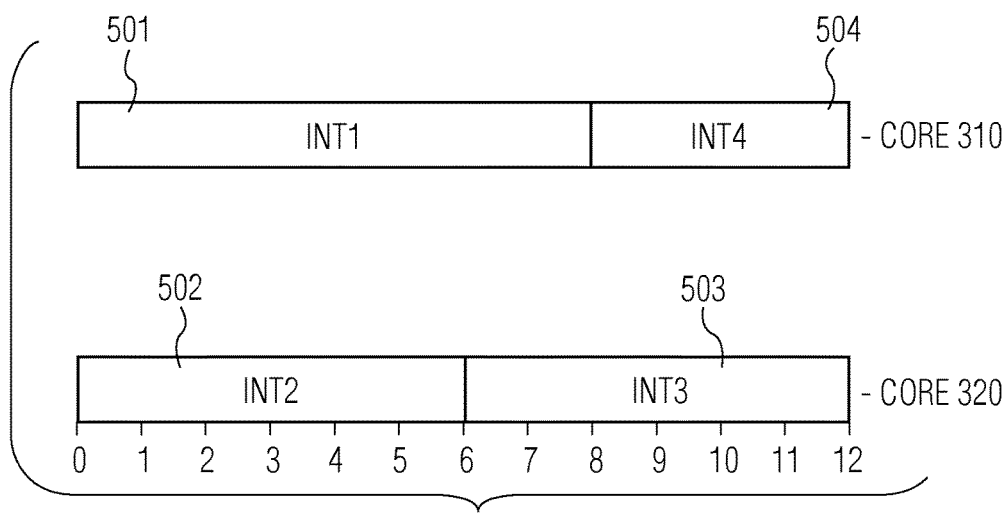
FIG. 7 shows interrupt scheduling for an embodiment in accordance with the invention.

However, in accordance with the invention, the purpose of having a multi-processor system is to reduce the power consumption while keeping the throughput the same as in single processor system 200 (12 seconds in this example). FIG. 7 shows an embodiment in accordance with the invention. Here, IID 350 reduces the operating frequency (the voltage is also reduced from 1.2 to 0.7) of processor 310 and processor 320 by a factor of two which results in interrupts 501 and 504 taking 12 seconds to complete and in interrupts 502 and 503 also taking 12 seconds to complete in parallel. To the user, the embodiment in FIG. 7 still appears to be single processor system 200. However, the embodiment in FIG. 7 uses less power than the embodiment in FIG. 5. FIG. 1 shows that the power consumption of the embodiment in FIG. 7 is about one third of the power consumption of the embodiment shown in FIG. 5 though both take the same total execution time.

Note that if the object is to increase throughput, it is advantageous to increase the number of processors but that two processors is typically the optimum solution for reducing power consumption in accordance with the invention.

The invention claimed is:

1. A multiprocessor system comprising:
a plurality of processors that includes a first processor and a second processor coupled to the first processor by a first bus;
a second bus coupled to the first bus;
a clock gating circuit directly coupled to the first processor and the second processor;
a first and second peripheral device coupled to the second bus; and
an interrupt distributor circuit coupled to the first bus and directly coupled to the first and second processor by an interrupt bus and directly coupled to the first and second peripheral device by a first and second peripheral interrupt line and directly coupled to the clock gating circuit, the interrupt distributor circuit being configured to:
receive interrupts on the first and the second peripheral interrupt lines, and in response to the interrupts received, distributes the interrupts between the first and the second processors and reduces power drawn by the plurality of processors by adjusting an operating frequency and operating voltage for the first and second processors.

2. The multiprocessor system of claim 1, wherein the interrupt distributor circuit is configured to adjust the operating frequency and operating voltage of the first and the second processors by sending commands to the clock gating circuit, and wherein the interrupt distributor circuit is further configured to cause a reduction in the operating frequency and operating voltage that maintains a throughput for the multiprocessor system, as present before the reduction in the operating frequency and operating voltage is caused, by the interrupt distributor circuit being configured to distribute the interrupts using a priority that is based on availability of the plurality of processors to serve the interrupts.

3. The multiprocessor system of claim 1 further comprising a nonvolatile memory capable of storing interrupt service routines and coupled to the first bus.

4. The multiprocessor system of claim 1 further comprising an SRAM memory coupled to the first bus.

5. The multiprocessor system of claim 1 where the second bus is an Advanced Peripheral Bus.

6. The multiprocessor system of claim 1 where the first peripheral device is an analog to digital converter.

7. The multiprocessor system of claim 1 where the second peripheral device is a Universal Asynchronous Receiver/Transmitter (UART).

8. The multiprocessor system of claim 1 where the interrupt distributor statically tunes the operating frequency and voltage of the multiprocessor system.

9. The multiprocessor system of claim 1, wherein the algorithm uses the number of processors in the plurality of processors, the operating frequency, the operating voltage, and a threshold voltage for turn on of transistors in the plurality of processors.

10. The multiprocessor system of claim 1, wherein the interrupt distributor circuit adjusts the operating voltage and operating frequency for the plurality of processors while sharing interrupts received and distributing the interrupts received among the processors based on which one of the processors is the first available processor.

11. The multiprocessor system of claim 1, wherein the algorithm is a power-aware scheduling algorithm configured to cause power-aware interrupt scheduling with priority constraints, whereby when multiple interrupts are received, the interrupts are scheduled according to a predefined interrupt priority.

12. The multiprocessor system of claim 3 wherein the nonvolatile memory is a multiport memory that has a separate port for each processor in the system and that stores interrupt service routines or interrupt handlers, and thereby allows each of the processors to handle the received interrupts.

13. The multiprocessor system of claim 4 where the SRAM memory is a multiport memory that has a separate port for each processor in the system.

14. The multiprocessor system of claim 9, wherein the algorithm uses a velocity of saturation for the transistors.

15. The multiprocessor system of claim 14, wherein the algorithm uses switching capacitances of the transistors at different values of the operating voltage.

16. The multiprocessor system of claim 14, wherein the interrupt distributor circuit statically and dynamically tunes the operating voltage and operating frequency for the plurality of processors while sharing interrupts received and distributing the interrupts received among the processors based on their availability.

17. The multiprocessor system of claim 14, wherein the interrupt distributor circuit adjusts the operating voltage and operating frequency for the plurality of processors while sharing interrupts received and distributing the interrupts received among the processors based on whether one of the processors is in idle mode and not busy, whereby the interrupt distributor circuit then routes a scheduled one of the interrupts to said one of the processors that is in idle mode and not busy.

18. The multiprocessor system of claim 14, wherein the interrupt distributor circuit adjusts the operating voltage and operating frequency for the plurality of processors while sharing interrupts received and distributing the interrupts received among the processors based on which one of the processors is the first available processor.

19. The multiprocessor system of claim 14, wherein the algorithm is a power-aware scheduling algorithm configured to cause power-aware interrupt scheduling with priority constraints, whereby when multiple interrupts are received, the interrupts are scheduled according to a predefined interrupt priority.

20. A method for making a multiprocessor system comprising:

providing a plurality of processors that includes a first processor and a second processor coupled to the first processor by a first bus;

providing a second bus coupled to the first bus;

providing a clock gating circuit directly coupled to the first processor and the second processor;

providing a first and second peripheral device coupled to the second bus; and providing an interrupt distributor circuit coupled to the first bus and directly coupled to the first and second processor by an interrupt bus and directly coupled to the first and second peripheral device by a first and second peripheral interrupt line and directly coupled to the clock gating circuit, the interrupt distributor circuit configured to:

receive interrupts on the first and the second peripheral interrupt lines, distribute, in response to an algorithm that is based upon the interrupts received and the number of processors in the plurality of processors, interrupts received on the peripheral interrupt lines between the first and the second processors, and reduce power drawn by the plurality of processors during handling of the receive interrupts by adjusting, based upon the algorithm, an operating frequency and operating voltage for the first and second processors.

* * * * *